3,102,063
ASBESTOS FIBER BEATER SATURATION USING VERY SMALL INORGANIC PARTICLES

Leonard N. Ray, Jr., East Hempfield Township, Lancaster County, Pa., assignor to Armstrong Cork Company, Lancaster, Pa., a corporation of Pennsylvania
No Drawing. Filed Feb. 9, 1961, Ser. No. 88,002
5 Claims. (Cl. 162—155)

This invention relates generally to fibrous products and more particularly to water-laid products of chrysotile asbestos fibers. Still more particularly, the invention relates to the deposition of the rubber content of a synthetic rubber latex upon chrysotile asbestos fibers while in suspension in water, and thereafter forming the resulting slurry of coated fibers into products such as sheets and the like.

The beater saturation of asbestos in an aqueous slurry has presented problems. Processes which work with cellulose fibers are inoperable when applied to asbestos fibers. When the usual synthetic rubber latices are added to such an asbestos slurry, clumping promptly occurs. Particular processes are thus necessary to successfully carry out the beater saturation of asbestos fibers. One such process is known as the citrate process and is fully described in U.S. Patent 2,759,813—Feigley, issued August 21, 1956.

It is the primary object of the present invention to present a product and process wherein asbestos fibers are treated to render those fibers susceptible to the deposition thereon of the rubber content of a synthetic rubber latex. It is a further object of the present invention to present a simple, economical, and easily controlled process for the production of beater saturated asbestos products having a wide variety of predetermined properties.

The invention contemplates forming a slurry of chrysotile asbestos fibers in water. To this slurry there are added water-insoluble, inorganic particles of very small particle size, 1 micron or less. To the treated slurry there is then added a synthetic rubber latex. Simple agitation brings about deposition of the rubber content of the synthetic rubber latex onto the chrysotile asbestos fibers and the inorganic particles. The resulting slurry of fibers and particles is then formed into a product such as a sheet by draining the water therefrom.

The slurry of chrysotile asbestos fibers may be formed in known manner. The fibers are added to sufficient water in a chest or other convenient container in an amount such that the resulting slurry contains about 0.3–5% by weight fibers. The preferred consistency of the slurry during the refining step will generally be in the higher ranges of the limits stated. Refining may be carried out in a mechanical refiner such as a beater, Jordan engine, disc refiner, or the like to produce a slurry wherein the fibers have been reduced to the desired length and diameter. Generally, such refining will be equivalent to that produced in about 5–15 minutes in a Valley laboratory beater with standard weights. After refining, the slurry may be diluted to the consistency desired for further treatment. This consistency will generally be in the range of about 0.5–1.5%.

The slurry is then ready for the addition of the water-insoluble, inorganic particles of very small particle size. As examples of these particles there may be mentioned silica, the clays, titanium dioxide, diatomaceous earth, calcium silicates, aluminum silicates, and the more complex silicates such as potassium alumino-silicates, and potassium magnesium alumino-silicates. Various mixtures and combinations of these inorganic particles may be used.

The size of the inorganic particles must be very small in order that the desired conditioning of the asbestos fibers will occur. The particles must be of a size of 1 micron or less to have the desired effect on the asbestos fibers. The smaller the particles below the maximum of 1 micron, the more effective are the particles, as a general rule. Colloidal particles are preferred, particularly those in the 0.010–0.020 micron range. It will be recognized that in most instances the size of the particles to be used will actually be a range of sizes. The presence of particles larger than the 1 micron maximum size does no harm so long as there are present sufficient particles of the proper size. For example, a good, operable aluminum silicate contains the following typical particle size distribution.

| Particle size (microns): | Percent by weight |
| --- | --- |
| 0–½ | 44 |
| ½–1 | 28 |
| 1–2 | 20 |
| 2–5 | 8 |

These water-insoluble inorganic particles are all inert as far as chemical reaction under these beater saturation conditions is concerned.

The amount of the water-insoluble inorganic particles to be used will vary between about 4%–150% by weight of particles of the proper size based on the dry weight of the chrysotile asbestos fibers. As mentioned earlier, the presence of larger size particles added along with particles of the proper size will have no deleterious effect on the process.

The amount of the finely-divided, water-insoluble, inorganic particles to be used can be varied widely and is dependent upon the requirements of the final product. In this connection, gasketing products having a wide variation in individual characteristics may be produced by varying the amount of inorganic particles utilized with the asbestos. The greater the amount of inorganic particles used in such products, the greater the flow properties of the gasket in use. Softer sheets can be prepared by increasing the amount of clays or diatomaceous earth. At the other extreme, relatively small amounts of the inorganic particles may be used if sheets having the properties approaching those of rubber-coated asbestos sheets with no added materials are desired. The inorganic particles will be used in an amount of from about 4% to about 150% by weight based on the weight of the asbestos fibers. Amounts greater than the stated maximum have too great a masking effect on the asbestos fibers, while amounts less than the stated minimum do not sufficiently condition the asbestos.

The finely-divided inorganic material may be added directly to the asbestos slurry as a dry powder or it may be dispersed in water prior to its addition to the asbestos slurry. Gentle agitation is normally maintained in the slurry during and after the addition of the finely-divided inorganic material.

Although the exact mechanism taking place during the process is not understood, it is postulated that a difference in electrical charge of the finely-divided inorganic particles relative to the chrysotile asbestos fibers is a primary factor in the attraction and retention of the inorganic particles on the chrysotile asbestos fibers.

In any case, once the finely-divided, inorganic particles have been added to the asbestos slurry, the slurry is then ready for the addition of the synthetic rubber latex.

The latex to be added may be any of a number of synthetic rubbers used in the practice of conventional beater saturation methods. Typical of these synthetic rubbers are the products known as GR–S (SBR) which are copolymers of butadiene and styrene containing about 50% to about 70% by weight butadiene. There may also be used the rubbers designated as Buna N, or Hycar (NBR); these are copolymers of butadiene and acrylonitrile containing about 50% to about 80% by weight butadiene. The neoprenes (CR) may also be used. The neoprenes are polymers of 2-chloro-butadiene-1,3, which polymers are also known as polychloroprene. There may be employed the homopolymers of butadiene (BR) as well as homopolymers and/or copolymers of butadiene homologues such as the isoprene rubbers (IR). These are the materials which are generally designated as synthetic rubbers herein. They may be more specifically designated as rubber-like polymers of butadiene, isoprene, and chloroprene, and rubber-like copolymers of butadiene or isoprene with copolymerizable vinyl compounds such as styrene and acrylonitrile. These synthetic rubbers are added to the slurry in the form of their latices. The latices normally contain about 25% to about 50% by weight rubber solids. The latices contain additional compounding ingredients such as stabilizers and the like which are well-known to the art and which form no part of the present invention.

The synthetic rubber latex is added as such to the particle-treated slurry of asbestos fibers. The entire mass is agitated whereby it will be found that the rubber content of the synthetic rubber latex will deposit evenly and smoothly onto the particle-reacted chrysotile asbestos fibers. The resulting slurry of rubber-coated fibers is then formed into a product such as a sheet either on conventional papermaking equipment such as a Fourdrinier wire or cylinder machine, or in shaped molds which allow the draining of the water while retaining the rubber-coated fibers.

The amount of rubber to be deposited on the fibers may be selected in accordance with the requirements of the final product. Generally speaking, the amount of rubber deposited on the fibers will be in the range of about 10%–75% by weight rubber based on the dry weight of the fibers. Where the final product is to be a sheet from which gaskets are to be cut, the amount of rubber in the sheet will be adjusted in accordance with the requirements of the particular use for the particular gasket. Most frequently it will be found that about 20%–30% by weight rubber based on the dry weight of the asbestos fibers yields good all-around sheet goods which lend themselves to gasketing applications and to use of the product as a backing for floor covering material such as plastic flooring sheets and tiles.

The following examples illustrate several embodiments of the invention. All parts are by weight unless otherwise stated.

*Example 1*

A series of slurries of chrysotile asbestos fibers was prepared, each slurry containing 37.5 parts of 5–D chrysotile asbestos fibers and 2900 parts of water. The fibers were refined 15 minutes in a Valley laboratory beater. To each of three such slurries was added a suspension of colloidal silica wherein the approximate particle diameter of the silica particles was 0.015 micron. The silica suspension contained 30% solids. In each case, after the addition of the colloidal silica suspension, there was added 18.8 parts of a butadiene-styrene copolymer latex containing 40% solids.

Where 6.5 parts of the colloidal silica suspension was added, rubber precipitation took place in 5 minutes, yielding a stock having a Canadian 3-gram freeness of 760. When 7.8 parts of the colloidal silica was added, precipitation time was 4 minutes, giving a Canadian freeness of 730. When 10 parts of the colloidal silica was added, precipitation was complete in 6 minutes, and the Canadian freeness was 630.

In each case the slurry of coated fibers was formed into a sheet in a Williams mold, wet-pressed, and dried at 190° F. in an air-circulating oven. The resulting sheets were tough and strong and suitable as a backing for plastic flooring or as a gasketing material.

*Example 2*

Example 1 was repeated using 37.5 parts of a colloidal silica of particle size 0.015–0.020 micron (Cabosil). Precipitation time was 10 minutes, and the final Canadian freeness was 470. A good sheet resulted.

This run is repeated using as the synthetic rubber a polychloroprene latex having a solids content of 51% (Neoprene 750). An excellent rubber-bonded asbestos sheet resulted.

*Example 3*

Example 1 is repeated using 37.5 parts of titanium dioxide having an average particle size in the range of 0.02–0.3 micron. Precipitation time was 9 minutes, and the Canadian 3-gram freeness was 780.

*Example 4*

A beater saturation process was carried out using 37.5 parts 5–D chrysotile asbestos fibers, 37.5 parts aluminum silicate particles (ASP–200), and 18.8 parts of a butadiene-styrene copolymer containing 40% by weight solids. The particle size distribution of the ASP–200 product is as follows.

| Particle size (microns): | Percent by weight |
|---|---|
| 0–½ | 44 |
| ½–1 | 28 |
| 1–2 | 20 |
| 2–5 | 8 |
| 5–10 | 0 |
| 10–35 | 0 |

Precipitation was complete in 8 minutes to give a slurry having a Canadian freeness of about 800.

The run was repeated using 55 parts of the ASP–200 product. Precipitation time again was 8 minutes, and the Canadian freeness on the rubber-coated fibers was about 800.

The run was repeated with 37.5 parts of aluminum silicate particles, all other ingredients being the same. The aluminum silicate particles were identified as ASP–400. The size distribution of ASP–400 is as follows.

| Particle size (microns): | Percent by weight |
|---|---|
| 0–½ | 4 |
| ½–1 | 6 |
| 1–2 | 10 |
| 2–5 | 31 |
| 5–10 | 30 |
| 10–35 | 19 |

Large clumps were obtained in this precipitation. A suitable sheet could not be formed.

I claim:
1. In the method of making a beater saturated sheet wherein the rubber content of a synthetic rubber latex is smoothly and evenly deposited on the surface of chrysotile asbestos fibers, and forming a sheet from the resulting rubber coated fibers, the improved step of pre-treating said asbestos fibers to prevent coagulation of said synthetic rubber latex and to cause said smooth and even deposi- tion of said rubber on said fibers consisting of adding to the slurry of asbestos fibers prior to the addition of the synthetic rubber latex an additive comprising a treating mass consisting of from about 4 to 150% by weight based on the dry weight of the fibers of water-insoluble, inorganic particles, at least 72% by weight of said particles having a maximum size of 1 micron, while maintaining gentle agitation in the slurry, said particles being selected from the group consisting of silica, clay, titanium dioxide, diatomaceous earth, silicates and mixtures thereof.

2. A method according to claim 1 wherein said synthetic rubber comprises a butadiene-styrene copolymer.

3. A method according to claim 1 wherein said rubber comprises a butadiene-acrylonitrile copolymer.

4. A method according to claim 1 wherein said rubber comprises a polychloroprene.

5. A method according to claim 1 wherein said size is in the range of about 0.010–0.020 micron.

References Cited in the file of this patent

UNITED STATES PATENTS

| | | |
|---|---|---|
| 1,556,973 | Sulzberger | Oct. 13, 1925 |
| 1,956,053 | Tucker | Apr. 24, 1934 |
| 2,011,915 | Seigle | Aug. 20, 1935 |
| 2,133,693 | Greider | Oct. 18, 1938 |
| 2,311,244 | Novak | Feb. 16, 1943 |
| 2,493,604 | Walters | Jan. 3, 1950 |
| 2,567,558 | Greider | Sept. 11, 1951 |
| 2,657,991 | Walsh | Nov. 3, 1953 |
| 2,797,163 | Smith et al. | June 25, 1957 |
| 2,807,543 | McQuiston | Sept. 24, 1957 |

UNITED STATES PATENT OFFICE

CERTIFICATE OF CORRECTION

Patent No. 3,102,063                                                August 27, 1963

Leonard N. Ray, Jr.

It is hereby certified that error appears in the above numbered patent requiring correction and that the said Letters Patent should read as corrected below.

Column 4, line 29, for "0.02-0.3" read -- 0.2-0.3 --.

Signed and sealed this 3rd day of March 1964.

(SEAL)
Attest:
ERNEST W. SWIDER                                         EDWIN L. REYNOLDS Attesting Officer                                         Acting Commissioner of Patents